(12) United States Patent
Van Gorder et al.

(10) Patent No.: US 9,876,836 B1
(45) Date of Patent: Jan. 23, 2018

(54) CONTEXTUAL GENERATION AND SUBSTITUTION OF AUDIOVISUAL APPLICATION RESOURCES

(71) Applicant: Amazon Technologies, Inc., Seattle, WA (US)

(72) Inventors: Matthew James Van Gorder, Redmond, WA (US); Alistair Robert Hirst, Redmond, WA (US); Quais Taraki, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 233 days.

(21) Appl. No.: 14/673,786

(22) Filed: Mar. 30, 2015

(51) Int. Cl.
*G06F 15/16* (2006.01)
*H04L 29/06* (2006.01)
*A63F 13/335* (2014.01)
*H04L 12/26* (2006.01)

(52) U.S. Cl.
CPC .......... *H04L 65/602* (2013.01); *A63F 13/335* (2014.09); *H04L 43/0852* (2013.01); *H04L 67/42* (2013.01)

(58) Field of Classification Search
CPC ... H04L 65/602; H04L 43/0852; H04L 67/42; A63F 13/335
See application file for complete search history.

(56) References Cited

U.S. PATENT DOCUMENTS

2015/0369617 A1 12/2015 Ding et al.
2016/0296840 A1* 10/2016 Kaewell .............. H04L 67/1002

* cited by examiner

*Primary Examiner* — Ryan Jakovac
(74) *Attorney, Agent, or Firm* — Davis Wright Tremaine LLP

(57) ABSTRACT

Techniques described and suggested herein include systems and methods for generating and/or substituting application-local audiovisual data, such as audio, for analogous application-remote audiovisual data when remote resources upon which the executing application depends become unavailable. For example, an executing application may, nominally, be partially or fully dependent on remote resources. If audiovisual data, such as audio resources used by the application, are ordinarily accessed by the application from a remote resource, but that remote resource (or some or all of the audiovisual data associated therewith) is/are unavailable to the application, the techniques described herein may be used to generate and/or select application-local substitute audiovisual data, so as to provide a user of the application a more consistent user experience, as well as to reduce reliance by the application on the stability and/or availability of the remote resource.

20 Claims, 6 Drawing Sheets

CONTEXTUAL GENERATION AND SUBSTITUTION OF AUDIOVISUAL APPLICATION RESOURCES

BACKGROUND

As various types of applications increasingly rely on resources stored remotely (e.g., over a network) from a given application-executing device, the operation of such applications becomes increasingly reliant on the quality and reliability of the connection between the device and the remote resource. As may be contemplated, interruptions in connectivity may cause adverse effects in the operation of an application so configured, and in turn, the user experience for the application may be negatively affected. For example, data packet loss during transmission may occur or the remote resource may become unreachable.

Applications with user experiences that rely on audiovisual content, such as game applications, may be disproportionately affected by interruptions, mismatches, delays, or desynchronization of the audiovisual content relative to a user's actions and/or inputs, and/or, in some instances, relative to other audiovisual content being used by the application at a given time. If such audiovisual content is nominally streamed by an application from a remote location as a remote resource, when the connection between the application and the remote resource is interrupted or otherwise adversely affected, caching and similar techniques are of limited utility, as the nature and length of outage cannot easily be predicted and accounted for.

BRIEF DESCRIPTION OF THE DRAWINGS

Various embodiments in accordance with the present disclosure will be described with reference to the drawings, in which.

DETAILED DESCRIPTION

Figure 1:
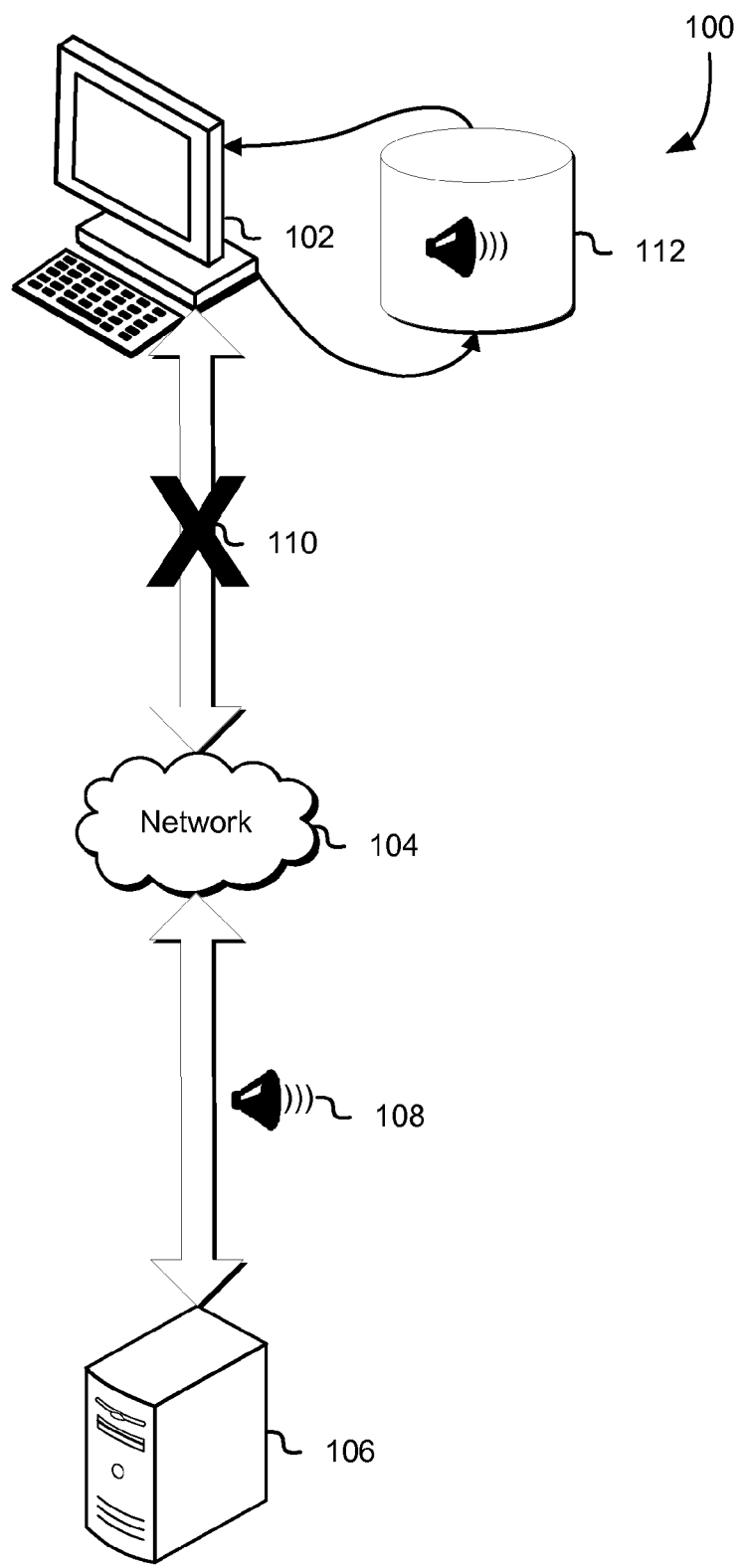
FIG. 1 schematically illustrates an example environment in which an executing application selects application-local audiovisual data in lieu of application-remote audiovisual data, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for generating and/or substituting application-local audiovisual data, such as audio resources, for analogous application-remote audiovisual data when remote resources upon which the executing application depends become unavailable, such as when data packet loss occurs or the remote resource is unavailable. For example, an executing application may, nominally, be partially or fully dependent on remote resources, such as may be the case if the application is partially or fully "streamed," e.g., over a network such as the Internet, to a client device upon which it is presented (and through which a user of the application interacts with the application). As a further example, the executing application may include interactive audiovisual data, such as would be the case if the application was a game application. If such audiovisual data, such as audio resources used by the application, are ordinarily accessed by the application from a remote resource, but that remote resource (or some or all of the audiovisual data stored thereon) is/are unavailable to the application, the techniques described herein may be used to generate and/or select an application-local substitute audiovisual resource, so as to provide a user of the application a more consistent user experience, as well as to reduce reliance by the application on the stability and/or availability of the remote resource.

In certain embodiments, one or more interpolation, extrapolation, or other data processing techniques may be used to calculate and/or generate contextually pertinent audiovisual data, based on one or more aspects of the executing application's state and/or other parameters. For example, in response to the unavailability of a remote resource upon which a given executing application ordinarily depends (e.g., to retrieve various application-remote audiovisual data), a component of the application may sample (e.g. retrieve information regarding) various parameters of the application over a predefined period of time preceding the time at which the remote resource became unavailable. Such sampling may include the identification of some or all audiovisual data used by the application during the predefined period of time. In certain embodiments, information regarding a pattern of user interaction (e.g., input commands, etc.) with the application may be identified. Such information may be processed to determine context, which in turn may be used to generate an appropriate substitute audiovisual resource.

As one example, a game application (or other application using audiovisual data) may be playing an audio track, such as background music, which may be interrupted due to a disruption in the flow of audiovisual data from a remote host. Based on information regarding the identity, content, and/or context of the background music playing prior to and at the time of interruption, a context-sensitive replacement may be located or generated, so as to provide minimal interruption of the audio track during the period of disruption.

As another example, a game application (or similar) may attempt to play a sound effect in response to a user input, or a set of user inputs. In the event that the sound effect is not available, e.g., from a remote host, the application or an entity associated therewith may generate or locate, based on the user input or set of user inputs that triggered the attempt, and/or the identity, content, and/or context of the intended sound effect, a replacement such that the unavailability of the audiovisual data minimally affects the user experience.

In some embodiments, a developer, administrator, maintainer, or user may interact with the application so as to define various parameters related to how, when, and/or under what conditions the techniques herein are utilized by an implementing application. For example, a developer or similar entity may programmatically define (such as through an application programming interface), what particular effects, audiovisual data, and the like should be called under specific conditions, such as interrupted connectivity between the application and a remote resource, high latency therein, and the like. As another example, a developer or similar entity may programmatically define various triggering conditions, as well as various masking and/or substitution techniques to be used when such triggering conditions occur.

As may be contemplated, the application-local audiovisual data may be pre-generated (e.g., static) and called upon when substitution of an analogous remotely stored audiovisual data becomes unavailable, or, in certain embodiments, the application-local audiovisual data may be generated on demand, e.g., through frequency modulation-based synthesis, frequency-based analysis and resynthesis (and subsequent reverse transformation into the time domain), time-based analysis, extrapolation and/or interpolation of other audiovisual data (e.g., whatever was stored in a local buffer at the time of interruption), some combination thereof, and the like. As may further be contemplated, if availability of the remote resource is restored, the remotely-stored audiovisual data provided may be different than the last used remote audiovisual resource, due to the possibility of a changing user context between the time availability was interrupted and the time availability was restored.

FIG. 1 schematically illustrates an example environment in which an executing application selects application-local audiovisual data in lieu of application-remote audiovisual data, in accordance with some embodiments. A client device 102 executes and/or renders information relating to an application, which may in some embodiments ordinarily be received over a network 104 from a host 106. For example, the application may partly or entirely be executed on the host 106, and some or all of the content of the executing application may be streamed over the network 104 to the client device 102. As another example, the application may be partly or entirely executed on the client device 102, but rely on a remote resource such as data stored on or otherwise provided by a host 106 for, e.g., audiovisual data. As may be contemplated, the application may partly executed on both the client device 102 and the host 106, in either static or dynamic proportion, depending on the specific nature of the application and/or its implementation.

The client device 102 may be any entity capable of transacting data with a host 106, such as over a network (including the Internet), and presenting such data (or an abstraction thereof) to a user of the client device 102. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the host 106 via application programming interface calls, web service calls, or other programmatic methods), and the like. In some embodiments, the client device 102 is capable of executing at least instructions pertaining to the generation of audiovisual data.

The application itself may be any executable code, in any format, that is capable of causing a computing system to perform tasks according to the instructions in the code. For example, the application may be one or more files or other data objects (e.g., binaries) containing machine code instructions and/or bytecode. The application may include pointers, stubs, and other indications of memory locations or other runtime-related numerical locations to which various segments of the application and/or any data objects (e.g., libraries, shared objects, data files, audiovisual data, system resources, and the like) upon which it depends should be located and/or placed, such as by a dynamic linker, dynamic loader, or other runtime-related layer, at or incident to runtime. The numerical values may represent specific locations in the addressable memory of the accessible system, may be in any format and/or of any length as appropriate for the implementation, and may depend on the nature of the runtime-related layer. The application may be configured (or configurable) to be executed, and/or retrieve data objects from, a separate device or location from the device or location at which it is presented to a user of the application.

The application may be formatted or otherwise structured in a fashion that is appropriate for the operating system and/or host architecture for which it is intended. For example, the executable may be formatted as a Portable Executable (PE), Executable and Linkable Format (ELF), Mach object (Mach-O), MZ, COM file, and the like. In some embodiments, the application may be formatted for multiple architectures. In some embodiments, the executable may include various tables that point to various data requirements (such as segments of executable code, external dependencies, and the like) as well as the appropriate memory locations or other runtime-related numerical locations for such data requirements at which the executable expects, e.g., a dynamic linker, loader, or other runtime-related layer to place the various data requirements at or incident to runtime.

The application may be of any type that uses and/or accesses audiovisual data, including but not limited game applications, interactive multimedia applications, web applications, and the like.

The host 106 may be any computing resource or collection of such resources capable of receiving and executing executable code. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the host 106 via application programming interface calls, web service calls, or other programmatic methods), and the like. In some embodiments, the resources of the host 106 may be one or more resources of a computing resource service provider, such as that described in further detail below.

In some embodiments, as described above, an application presented and/or executed on a client device 102 may nominally (e.g., under ordinary operational conditions), retrieve audiovisual data 108 from the host 106 over the network 104. However, in some circumstances, the connection between the client device 102 and the host 106 may be interrupted 110, or the audiovisual data 108 may otherwise become unavailable to the application presented or executed on the client device 102. In such a scenario, an application, and/or the client device 102 upon which it is executed or presented, may generate and/or retrieve application-local audiovisual data to substitute for the unavailable audiovisual data 108. In some embodiments, in response to receiving information regarding the unavailability of the remote resource (e.g., host 106) or the audiovisual data 108, the application, in some embodiments via the client device 102, retrieves and/or generates a substitute audiovisual resource, e.g., from or using a local resource 112 such as a data store or computing device.

For example, retrieval and/or generation of substitute audiovisual data may make use of data or metadata associated with the audiovisual data and/or one or more characteristics of the desired substitute audiovisual resource. As one example, data and/or metadata associated with the nominal stream of application-remote audiovisual data may be matched against data and/or metadata associated with, e.g., application-local audiovisual data that are available for substitution, so as to identify one or more relevant application-local audiovisual data. For example, the application or associated entity may determine that a substitute sound effect may need to be related to a metal-on-metal strike. Based on this information, a substitute application-local sound effect that approximates or represents a metal-on-metal strike may be generated and/or located. In some embodiments, an initial determination of the characteristics (e.g., along with appropriate metadata) may be confirmed, refined, or superseded if more data and/or metadata related to the appropriate context is determined and/or received after the initial determination is made.

The application and/or the client device 102 may detect data packet loss or unavailability of the remote resource (e.g., data on host 106) in any appropriate fashion. For example, the client device 102 may detect that a particular set of data packets, such as those associated with a particular piece of audio data, are missing or were not received properly. As another example, a request for a remote resource may simply time out, thereby alerting the application that the requested resource is unavailable. As another example, the client device 102 or associated component may implement a listener that periodically determines the viability of the host 106, the network 104, and the like. As another example, in circumstances where the lack of connectivity is planned and/or expected (e.g., ahead of scheduled maintenance of either the network 104 or the host 106), the host 106, the network 104, or some component thereof may send information to the client device 102 and/or the application of the impending unavailability.

After determining or otherwise obtaining information of the unavailability of the remote resource (e.g., data on host 106) and/or the audiovisual data 108 upon which the application relies, one or more processes are initiated by the application and/or the client device 102, or some component thereof, to generate and/or retrieve the substitute audiovisual resource. In some embodiments, the application may determine what prior audiovisual data were used over a period of time prior to the time of unavailability of the remote resource, and, as a result, use pattern matching to predictively determine one or more characteristics of a substitute application-local audiovisual resource. In some instances, the closest matching audiovisual data locally stored (e.g., on the local resource 112) may be retrieved, and the application may be configured (or may configure itself) to use the retrieved audiovisual data until such time as the remote resource (data on host 106) becomes available again.

In some embodiments, the application-local audiovisual data may be generated, rather than precomputed and/or retrieved. For example, parameters of the executing application, such as application states, user interaction states, data objects used and/or allocated for by the application, and the like, may be used to predictively determine one or more appropriate contexts of the application. Such contexts may include information relating to which audiovisual data, and/or which qualities of such audiovisual data, would be appropriate for the application to utilize at a given point in time (either during or after the period of time for which the parameters of the executing application are observed and/or processed).

As an example, a component associated with the application and/or the client device 102 may, after determining that a given remote resource upon which the executing application depends is unavailable, sample the parameters of the executing application, either at a time incident to the unavailability of the remote resource, or by determining the operation parameters of the executing application for a period of time preceding the unavailability event. Various types of information may be gathered and/or determined. For example, a pattern of user inputs to the application (e.g., a user context) leading up to the event may be determined. As another example, the remote audiovisual data accessed by the application leading up to the event may be determined. Such information is processed to determine an appropriate set of parameters and/or qualities that would be contextually appropriate for the state of the executing application, and, in combination with information regarding which specific audiovisual data are unavailable as a result of the unavailability event, application-local substitute audiovisual data may be generated, e.g., also by using the determined information.

By way of example, the user context of the application may indicate that the user is in a large battle scene and is actively and repeatedly using a metal sword to strike against other metal objects in the environment. Based on this information, the application may determine that an appropriate substitute sound effect may be related to metal-on-metal contact, and further may determine that based on the environment (large battle scene), the substitution may not need to have full fidelity. An appropriate substitute sound effect matching these qualities is either located or generated.

As another example, the user context of the application may require background music of a specific type (e.g., ambient, high-energy, etc.), and may differ if, e.g., the user context indicates that the user is participating in a large battle scene compared to a peaceful walk through a field. Based on this information, and in some embodiments based on the previously playing background music, appropriate substitutions for some or all of the disrupted and/or missing background music may be located and/or generated.

The generation of application-local substitute audiovisual data may occur using any appropriate component, and in any appropriate fashion. For example, previously used remote audiovisual data may be sampled (e.g., from an application-local buffer or cache from which they have not yet been flushed) and blended or averaged to create a substitute audiovisual resource. As another example, various data processing techniques, such as frequency-based analysis and resynthesis (e.g., via fast Fourier transforms and inverse Fourier transforms), time-based analysis, and/or a combination of frequency-based and time-based analysis, may be used on the overall sum (or portion thereof) of the audiovisual data used during the sampled period, so as to synthesize substitute audiovisual data with a matching, similar, or complementary profile (e.g., frequency and/or timing profile).

As previously mentioned, pre-existing application-local audiovisual data may be selected if they match the desired substitution characteristics. In certain embodiments, multiple such pre-existing audiovisual data may be combined and/or subject to data processing to generate one or more substitutes that more closely match the desired profile. As previously discussed, an initial match and/or generation may be updated and/or superseded if more relevant data from which to base the match becomes available. In some embodiments, the application-remote audiovisual data nominally used by the application (e.g., streamed by default) may have associated metadata that describe various contexts and other aspects of the audiovisual data. For example, locational information, tempo and other musical aspects, contextual and/or positioning information, provenance, and other characteristics may be described in such metadata. Similarly, application-local audiovisual data, such as those stored locally in the event that a substitution is necessary, may also have such associated metadata, thereby allowing for a match between the respective sets of metadata so as to ease the identification (and thus decrease the amount of processing of identification) of one or more appropriate substitutions.

As one example, a game application (or other application using audiovisual data) may be playing an audio track, such as background music, which may be interrupted due to a disruption in the flow of audiovisual data from a remote host. Based on information regarding the identity, content, and/or context of the background music playing prior to and at the time of interruption, a context-sensitive replacement may be located or generated, so as to provide minimal interruption of the audio track during the period of disruption.

As another example, a game application (or similar) may attempt to play a sound effect in response to a user input, or a set of user inputs. In the event that the sound effect is not available, e.g., from a remote host, the application or an entity associated therewith may generate or locate, based on the user input or set of user inputs that triggered the attempt, and/or the identity, content, and/or context of the intended sound effect, a replacement such that the unavailability of the audiovisual data minimally affects the user experience.

After detecting or otherwise receiving information that the remote resource (e.g., data on host 106) is available again, the nominal flow of audiovisual data from the remote resource may resume to the client device 102, and therefore the application. In some embodiments, some or all of the application's parameters may be determined and/or redetermined, in a similar fashion as discussed above, so as to resynchronize the then-current application state (e.g., including the then-current user context) with the remote resource, thereby allowing the remote resource to provide the appropriate application-remote audiovisual resource.

As used herein, audiovisual data may include audio components or resources, video components or resources, or some combination thereof. It is contemplated that the type of audiovisual data used to determine an application's parameters, its application state, the user context, and the like, may be the same or different than those generated or selected for substitution. For example, video resources may be used to determine which type and/or characteristics of audio resources should be used, and vice versa. Similarly, a different set of audio resources than those intended to be substituted for may be used to calculate the substitution parameters thereof.

Figure 2:
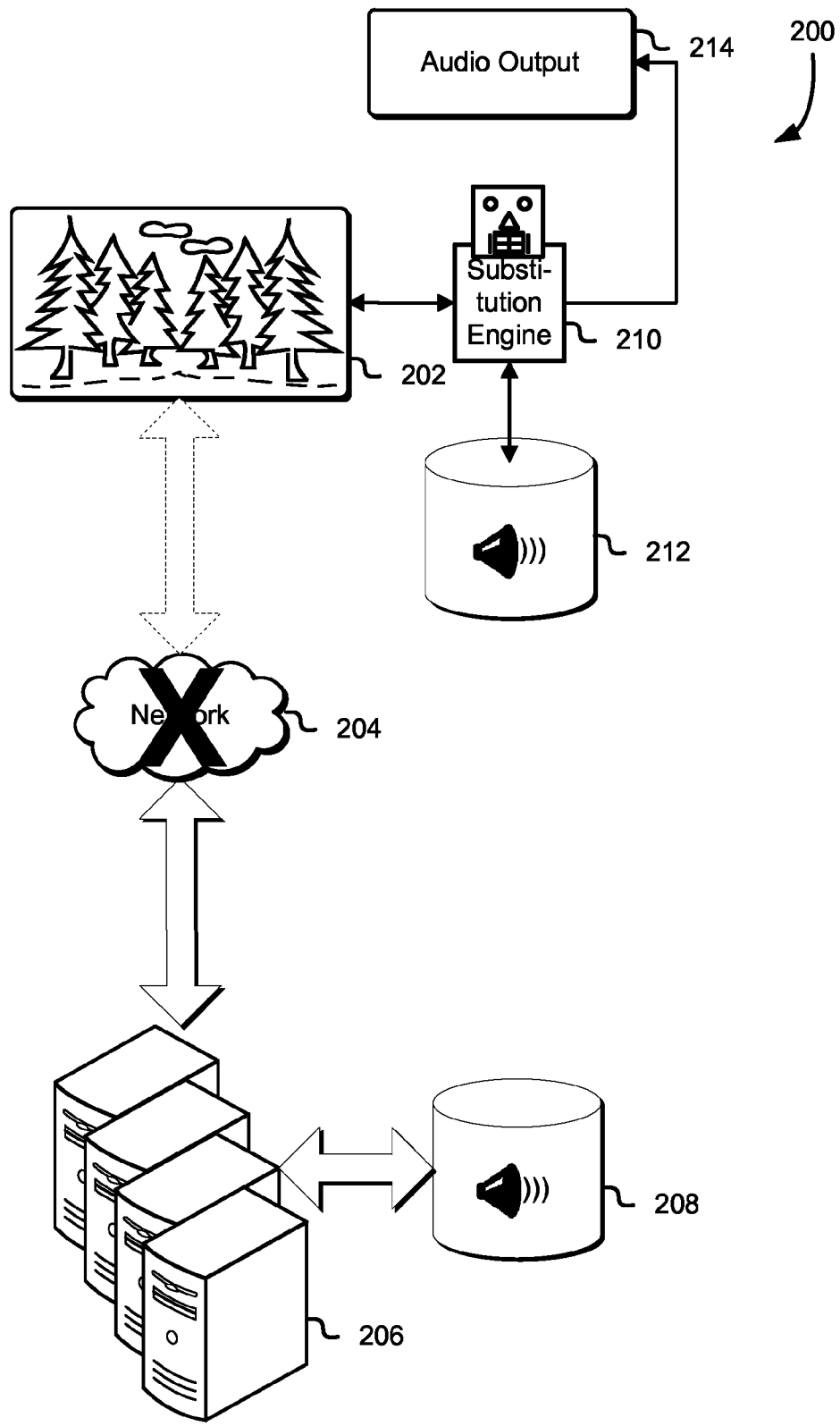
FIG. 2 schematically illustrates an example environment and workflow in which an executing application generates and/or is configured to use application-local audiovisual data in connection with an interruption of connectivity with remote resources, in accordance with some embodiments.

FIG. 2 schematically illustrates an example environment and workflow in which an executing application generates and/or is configured to use application-local audiovisual data in connection with an interruption of connectivity with/ access to remote resources, in accordance with some embodiments. An appropriate client device, in some embodiments similar to the client device 102 described above in connection with FIG. 1, executes and/or renders information relating to an application 202, which may in some embodiments ordinarily be received over a network 204 from one or more hosts 206. The network 204 and/or the host(s) 206 may, in some embodiments, be similar to the network 104 and host 106 described above in connection with FIG. 1.

As previously discussed, the application 202 may partly or entirely be executed on the host(s) 206, and some or all of the content of the executing application may be streamed over the network 204 to, e.g., the client device. As another example, also previously discussed, the application 202 may be partly or entirely executed on the client device, but rely on a remote resource such as data on host(s) 206 for, e.g., audiovisual data. As may be contemplated, the application may partly executed on both the client device and the host(s) 206, in either static or dynamic proportion, depending on the specific nature of the application and/or its implementation.

In some embodiments, as described above, an application 202 presented and/or executed on a client device may nominally (e.g., under ordinary operational conditions), retrieve audiovisual data 208 (e.g., from an associated data store or other component) from the host(s) 206 over the network 204. However, in some circumstances, the network connection 204 between the client device and the hosts 206 may experience packet loss or may be interrupted, or the audiovisual data 208 may otherwise become unavailable to the application presented or executed on the client device, e.g., as a result of a malfunction or other outage of the component storing and/or providing the audiovisual resource. In such a scenario, the application 202, and/or the client device upon which it is executed or presented, may generate and/or retrieve an application-local audiovisual data to substitute for the unavailable audiovisual data 208.

The application 202 and/or the client device may detect unavailability of data, for example due to packet loss, or unavailability of the remote resource (e.g., data on host(s) 206) in any appropriate fashion. For example, a request for a remote resource may simply time out, thereby alerting the application that the requested resource is unavailable. As another example, the client device or associated component (e.g., substitution engine 210) may implement a listener that periodically determines the viability of the host(s) 206, the network 204, and the like. As another example, in circumstances where the lack of connectivity is planned and/or expected (e.g., ahead of scheduled maintenance of either the network 204 or the host 206), the host 206, the network 204, or some component thereof may send information to the client device, the substitution engine 210, and/or the application of the impending unavailability. In some embodiments, in response to receiving information regarding the unavailability of the remote resource (e.g., data on host 206) or the audiovisual data 208, the application (and/or the substitution engine 212) retrieves and/or generates a substitute audiovisual resource, e.g., from or using a local resource 212 such as a data store or computing device.

The substitution engine 210 may be any computing resource or collection of such resources capable of processing and providing data in response to a request. The substitution engine 210 may be implemented in hardware, software (e.g., as a component of the application 202), or some combination thereof. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the host 106 via application programming interface calls, web service calls, or other programmatic methods), and the like. In certain embodiments, the substitution engine may be a module, library, or process, or a collection of such modules, libraries, and/or processes, associated with the application 202.

After determining or otherwise obtaining information of the unavailability of the remote resource (e.g., data on host(s) 206 and/or the audiovisual data 208 upon which the application 202 relies, the application 202 requests the substitution engine 210 to generate and/or retrieve the substitute audiovisual resource. In some embodiments, the substitution engine 210 may determine what prior audiovisual data were used by the application 202 over a period of time prior to the time of unavailability of the remote resource. For example, the substitution engine 210 may use pattern matching (e.g., based on the information sampled from the application 202) to predictively determine one or more characteristics of a substitute application-local audiovisual resource. In some instances, the closest matching audiovisual data locally stored (e.g., on the local resource 212) may be retrieved, and the application 202 may be configured (or may configure itself) to use the retrieved audiovisual data until such time as the remote resource (data on host(s) 206) becomes available again.

As previously discussed, an initial match and/or generation may be updated and/or superseded if more relevant data from which to base the match becomes available. In some embodiments, the application-remote audiovisual data nominally used by the application (e.g., streamed by default) may have associated metadata that describe various contexts and other aspects of the audiovisual data. For example, locational information, tempo and other musical aspects, contextual and/or positioning information, provenance, and other characteristics may be described in such metadata. Similarly, application-local audiovisual data, such as those stored locally in the event that a substitution is necessary, may also have such associated metadata, thereby allowing for a match between the respective sets of metadata so as to ease the identification (and thus decrease the amount of processing of identification) of one or more appropriate substitutions. For example, streamed audiovisual data may include metadata that indicates that it is generally relevant to a fight sequence, and includes other audiovisual data that have metadata more specifically relevant to explosions or other fight-related sound effects. Such information may be used to perform the aforementioned matching.

In some embodiments, the application-local audiovisual data may be generated, rather than precomputed and/or retrieved, by the substitution engine 210. For example, parameters of the executing application 202, such as application states, user interaction states, data objects (e.g., audiovisual data) used and/or allocated for by the application, and the like, may be used to predictively determine one or more appropriate contexts of the application 202. Such contexts may include information relating to which audiovisual data, and/or which qualities of such audiovisual data, would be appropriate for the application 202 to utilize at a given point in time (either during or after the period of time for which the parameters of the executing application are observed and/or processed).

As an example, the substitution engine 210, after determining that a given remote resource 208 upon which the executing application 202 depends is unavailable or that data packets have been lost, sample the parameters of the executing application 202, either at a time incident to the unavailability of the remote resource 208, or by determining the parameters of the executing application 202 for a period of time preceding the unavailability event. Various types of information may be gathered and/or determined by the substitution engine 210. For example, a pattern of user inputs to the application (e.g., a user context) leading up to the event may be determined. As another example, the remote audiovisual data accessed by the application leading up to the event may be determined. Such information, which may include metadata associated with the remote audiovisual data, is processed to determine an appropriate set of parameters and/or qualities that would be contextually appropriate for the state of the executing application, and, in combination with information regarding which specific audiovisual data are unavailable as a result of the unavailability event, application-local substitute audiovisual data may be generated, e.g., also by using the determined information. For example, the metadata of the remote audiovisual data may be matched against analogous metadata of application-local substitute audiovisual data so as to identify one or more appropriate substitutes.

In some embodiments, the substitution engine 212 may use remote audiovisual data used by the application 202 prior to the unavailability event (e.g., from an application-local buffer or cache from which they have not yet been flushed) and blend or average some or all of the remote audiovisual data so retrieved to create a substitute audiovisual resource. For example, if previously streamed background music was playing, and information (e.g., metadata) indicated that it had been playing in a looped format and, e.g., the user context had not changed, the substitution engine 212 may determine that a replay of the existing loop (which may be cached locally by the application from previous playback) would be the most appropriate substitution. As another example, if the interruption is determined to be time-limited, metadata relating to the background music indicating, e.g., a key signature and a tempo may be used to generate a brief interstitial in accordance with the key signature and in keeping with the tempo. As another example, if the substitution engine determines that an appropriate sound effect to play in response to, e.g., a sword hitting earth, was not remotely available (due to data packet loss) and only a metal-on-metal and earth-on-earth sound effects were available, the substitution engine 212 may combine the two so as to provide an approximation of the sound of a sword hitting earth.

As another example, various data processing techniques, such as frequency-based analysis and resynthesis (e.g., via fast Fourier transforms and inverse Fourier transforms), time-based analysis, or some combination thereof, may be used on the overall sum (or portion thereof) of the audiovisual data used during the sampled period, so as to synthesize substitute audiovisual data with a matching, similar, or complementary profile (e.g., frequency and/or timing profile). Such synthesis may occur, in whole or in part, by reversing the transformation used to generate the frequency-based and/or time-based analysis (e.g., inverse Fourier transform). Furthermore, as previously mentioned, pre-existing application-local audiovisual data (e.g., 212) may be selected if they match the desired substitution characteristics. In certain embodiments, multiple such pre-existing audiovisual data may be combined and/or subject to data processing to generate one or more substitutes that more closely match the desired profile. In some of such embodiments, synthesized and pre-existing audiovisual data may be combined and/or blended using the techniques described herein.

In some embodiments, the substitution engine 210 may, as illustrated, act as an interstitial component that directs substitute audiovisual data to an audio output 214 normally used by the application 202 to convert the audiovisual data to audible sound. However, other embodiments are contemplated, such as embodiments where the substitution engine 210 directly substitutes application-local audiovisual data used by the application 202, prior to (or in connection with) such audiovisual data being sent directly from the application 202 to the audio output 214.

After detecting or otherwise receiving information that the remote resource (e.g., data on host 206) is available again, the substitution engine 210 may direct the application 202 to resume retrieval of audiovisual data from the remote resource 208. In some embodiments, some or all of the application's parameters may be determined and/or redetermined, in a similar fashion as discussed above, so as to resynchronize the then-current application state (e.g., including the then-current context/parameters) with the remote resource 208 and/or the host(s) 206, thereby allowing the remote resource 208 (through the host(s) 206) to provide the appropriate application-remote audiovisual resource.

As previously discussed, it is contemplated that the type of audiovisual data used to determine an application's parameters, its application state, the user context, and the like, may be the same or different than those generated or selected for substitution. For example, video resources may be used by the substitution engine 210 to determine which type and/or characteristics of audio resources should be used and/or generated, and vice versa. Similarly, a different set of audio and/or video resources than those intended to be substituted for may be used to calculate the substitution parameters thereof.

Figure 3:
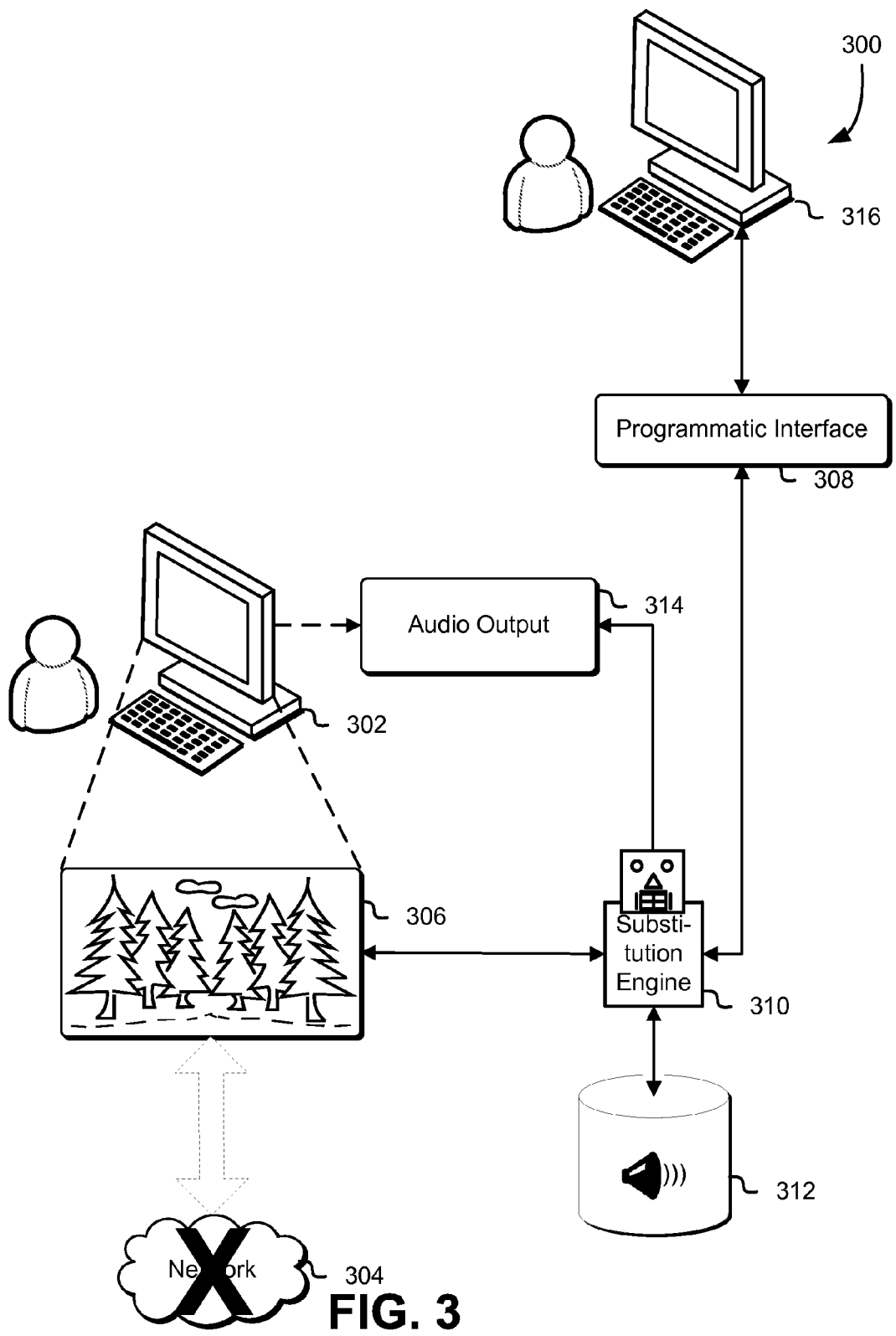
FIG. 3 schematically illustrates an example environment and workflow for enabling the configuration of an application or component thereof to use and/or generate application-local audiovisual data when remote resources are unavailable, in accordance with some embodiments.

FIG. 3 schematically illustrates an example environment and workflow for enabling the configuration of an application or component thereof to use and/or generate application-local audiovisual data when remote resources are unavailable, in accordance with some embodiments. An appropriate client device 302, in some embodiments similar to the client device 102 described above in connection with FIG. 1 and FIG. 2, executes and/or renders information relating to an application 306, which may in some embodiments ordinarily be received over a network 304. The network 304 may, in some embodiments, be similar to the network 104, 204 described above in connection with FIGS. 1 and 2.

In some embodiments, as described above, an application 306 presented and/or executed on a client device 302 may nominally (e.g., under ordinary operational conditions), retrieve audiovisual data over the network 306. However, similarly to previously discussed, in some circumstances, data packets may be lost or the network connection 304 may be interrupted, or the audiovisual data may otherwise become unavailable to the application 306 presented or executed on the client device 302, e.g., as a result of a malfunction or other outage of the component storing and/or providing the audiovisual resource. In such a scenario, similarly to as discussed in connection with FIGS. 1 and 2, the application 306, and/or the client device 302 upon which it is executed or presented, may generate and/or retrieve application-local audiovisual data (e.g., from local resource 312, which may be similar to the local resource 212, described above in connection with FIG. 2) to substitute for the unavailable audiovisual resource, e.g., via a substitution engine 310, which may be similar to the substitution engine 210 described above in connection with FIG. 2. As previously discussed, in embodiments where the audiovisual data substituted and/or generated are audio resources, the substitution engine 310 and/or the application 306 (via client device 302) may interface with an audio output 314 to play back the appropriate audio resources (e.g., either the application-remote or the application-local audiovisual data as appropriate).

The substitution engine 210 may provide a programmatic interface 308 for an administrative entity 316, either human or automated, to interact with the substitution engine 310 so as to define and/or modify some or all of its functionality, such as described herein, via substitution parameters. The programmatic interface 308 may enable communication between the administrative entity 316 via application programming interface calls, web service calls, or other programmatic methods. In certain embodiments, the programmatic interface 308 may complement a user interface (e.g., a graphical user interface). In certain embodiments, the substitution engine may be a module, library, or process, or a collection of such modules, libraries, and/or processes, associated with the application 202.

The administrative entity 316 may be any entity capable of transacting data with the substitution engine 310 via the programmatic interface 308, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the host 106 via application programming interface calls, web service calls, or other programmatic methods), and the like. The administrative entity 316 may be a component of another computing system, or, in some embodiments, under control of a human user.

Examples of substitution parameters follow. The programmatic interface 308 may allow the administrative entity 316 to define and/or modify the conditions under which the substitution engine 310 substitutes application-remote audiovisual data for an application-local audiovisual resource. For example, the administrative entity 316 may define and/or update the substitution engine 310 such that temporarily unavailability, e.g., delays in retrieval below a predefined length, does not trigger the substitution processes described herein. As another example, the programmatic interface 308 may enable the administrative entity 316 to define varying amounts and/or levels of substitution, based on the severity and/or expected and/or detected length of a given outage or other unavailability. In addition, the programmatic interface 308 may allow specification of a list of pre-defined audio that should be substituted in certain situations, for example based on matching a detected event in the audiovisual stream with audio data for substitution associated with that event. In some embodiments, the list may be defined to include relationships between scenarios and events, such as in a tree and/or graph format, such that a given defined substitution may, when executed, trigger additional related substitutions.

The programmatic interface 308 may also define the substitution methods used as well as the conditions in which they are triggered, e.g., data processing methods used when synthesizing and/or combining new audiovisual data for substitution, when to use pre-defined substitute audiovisual data (e.g., from local resource 312) as opposed to synthesizing new substitute audiovisual data, and the like.

The programmatic interface 308 may further allow the administrative entity 316 to provide instructions to the substitution engine 310 to perform certain types of substitution in response to, e.g., administrative entity-defined application parameters, contexts, and the like. For example, the programmatic interface 308 may allow the administrative entity 316 to instruct the substitution engine 310 to use a certain type or subset of substitutions (which may or may not be defined in another context) in specific scenarios, such as in one class of user context, or in certain application states.

Figure 4:
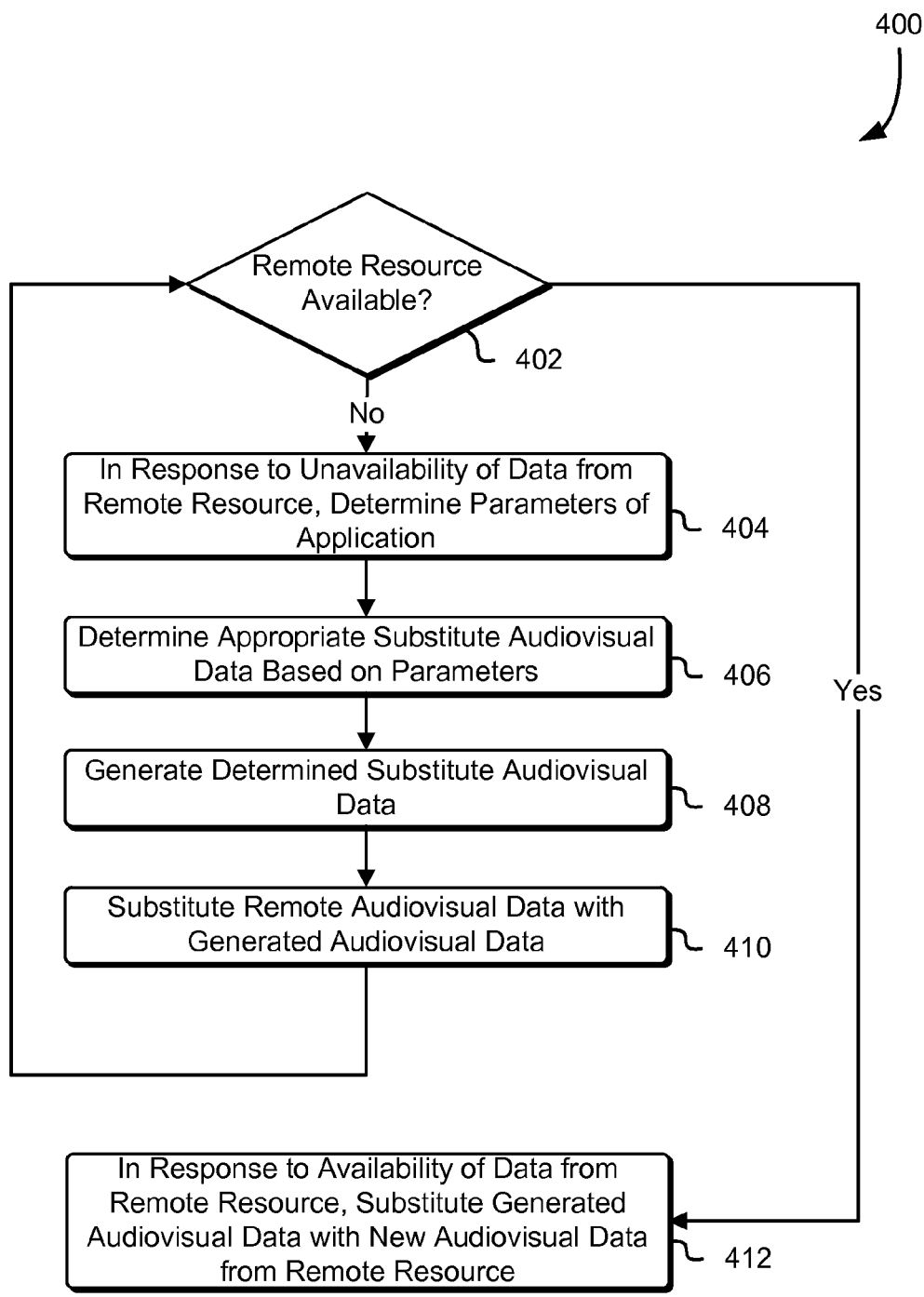
FIG. 4 schematically illustrates an example process for generating and configuring application-local audiovisual data for use when remote resources are unavailable, in accordance with some embodiments.

FIG. 4 schematically illustrates an example process for generating and configuring application-local audiovisual data for use when remote resources are unavailable, in accordance with some embodiments. At decision point 402, a determination, such as by a substitution engine as described above in connection with FIGS. 2-3, is made as to the availability of data from a remote resource, or the resource itself, upon which a given application depends. As previously discussed in connection with at least FIGS. 1-2, the unavailability information may be received from the application or from the remote resource/host, and may regard a future or current unavailability event.

If the data from the remote resource (or the remote resource itself) is determined to be unavailable at decision point 402, at step 404, in response to receiving information regarding the unavailability of the remote resource, an entity, such as a substitution engine as described above in connection with FIGS. 2-3, determines one or more parameters of an application. Also as previously discussed, the parameters may pertain to application states, contexts (e.g., user contexts such as interaction contexts), and the like.

At step 406, using the parameters determined in step 404, an entity, such as the substitution engine, determines one or more appropriate substitute application-local audiovisual data for those which have become or will become unavailable, in a fashion similar to described above in connection with at least FIGS. 1-3. Such a determination may, as previously discussed, be made such that the identified characteristics of appropriate substitute audiovisual data are contextually appropriate for the application state, the user interaction context, and the like.

At step 408, the appropriate substitute audiovisual data determined in step 406 is generated and/or retrieved by, e.g., the substitution engine, in accordance one or more of the various techniques discussed herein. For example, the substitute audiovisual data may be synthesized, retrieved from storage, or some combination of the two.

At step 410, the substitution engine or other entity substitutes the substitute audiovisual data generated at step 408 for the (in some embodiments, missing) extant audiovisual resource. As previously discussed in connection with at least FIGS. 2-3, such substitution may be made directly by the substitution engine as an interstitial entity between the application and the user-facing audio output, or, in some embodiments, the substitution may be made by providing the application with the substitute audiovisual resource. In some embodiments, detection and/or monitoring of the availability of the remote resource may be continuous and/or periodic as steps 404-410 are executed.

In the case that the remote resource is determined to be available at step 402 (either initially or during continuous/periodic monitoring), at step 412, after, e.g., the substitution engine detects that the remote resource is sufficiently available, the application is configured (e.g., by the substitution engine) to use the remote resource as the source for the audiovisual resource, thereby replacing the application-local substitute with the normal application-remote resource. As previously discussed, various parameters regarding the application may be provided to the remote resource so as to resynchronize the application and the remote resource, so as to enable the remote resource to provide a context-appropriate resumption of audiovisual data provision.

By way of example, a game application may ordinarily stream background music and situational sound effects from a remote resource. In the event of data packet loss and/or outage of the remote resource, a substitution engine may determine user context and/or other information relating to the streaming audiovisual data, such as metadata, so as to determine the characteristics of one or more appropriate substitutions. In this example, the substitution engine may use the user context to match one or more appropriate situational sound effects (e.g., weapon usage, explosions caused by user actions), while using some or all of the metadata associated with the streaming audiovisual data to either generate or locate an appropriate substitute for background music. After the data packet loss and/or remote resource outage is over, and the streaming audiovisual data are once again available, the game application may be resynchronized so as to cause the transition between the substituted audiovisual data and the streamed audiovisual data to be minimally invasive to the user experience.

Figure 5:
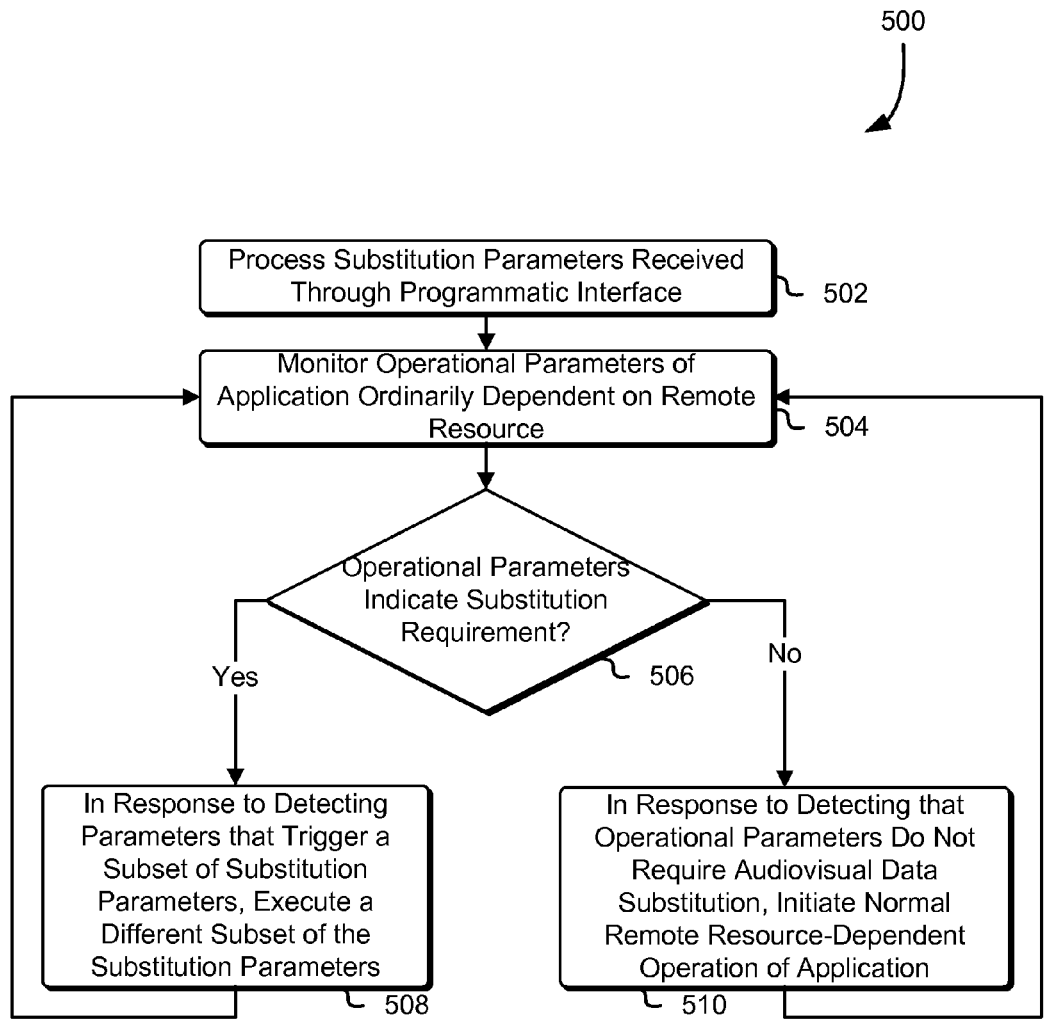
FIG. 5 schematically illustrates an example process for programmatically receiving substitution parameters that at least partly define behavior of an executing application with regard to audiovisual data when remote resource become unavailable, in accordance with some embodiments.

FIG. 5 schematically illustrates an example process for programmatically receiving substitution parameters that at least partly define behavior of an executing application with regard to audiovisual data. At step 502, an entity, such as a substitution engine as previously described in connection with FIGS. 1-4, processes substitution parameters received through a programmatic interface. Examples of such substitution parameters, as well as ways in which a given administrative entity interacts with the substitution engine, are provided above in connection with at least FIG. 3.

At step 504, an entity, such as the substitution engine, monitors parameters of the application, in some instances in accordance with a subset of the substitution parameters provided in connection with step 502. At decision point 506, a determination is made, e.g., by the substitution engine, as to whether the parameters monitored in step 504 indicate that audiovisual data necessitates substitution, e.g., as a result of detecting that some or all of the parameters trigger a subset of the substitution parameters.

If the parameters trigger a subset of the substitution parameters, at step 508, in response to detecting that the parameters monitored at step 504 trigger that some or all of the aforementioned subset of the substitution parameters provided in connection with step 502, a different subset of the substitution parameters may be executed, e.g., by the substitution engine, so as to generate or determine an appropriate substitute for the audiovisual data determined to require substitution (e.g., as defined at step 504). As depicted, the monitoring of the parameters by, e.g., the substitution engine, may be continuous and/or periodic.

If the parameters do not indicate (or no longer indicate) that a given audiovisual data requires (or could benefit from) substitution, and/or if the parameters no longer trigger the subset of substitution parameters, at step 510, normal operation is restored, e.g., by the substitution engine, such as by reconfiguring the application to rely upon audiovisual data available on the remote resource. Such restoration and/or reconfiguration may include blending and/or resynchronization of the audiovisual resource, such as described above in connection with at least FIGS. 1-4.

Figure 6:
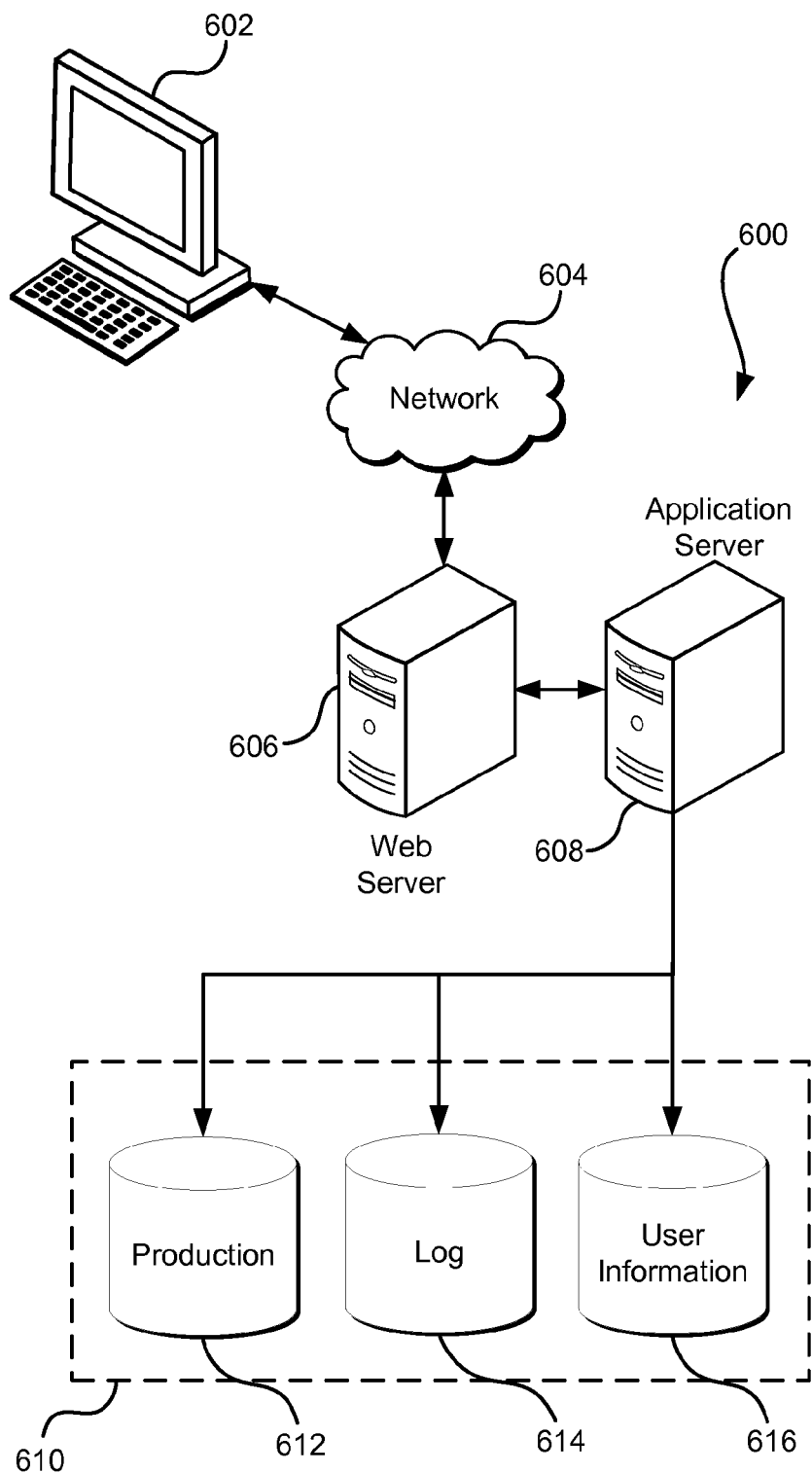
FIG. 6 illustrates an environment in which various embodiments can be implemented.

FIG. 6 illustrates aspects of an example environment 600 for implementing aspects in accordance with various embodiments. As will be appreciated, although a web-based environment is used for purposes of explanation, different environments may be used, as appropriate, to implement various embodiments. The environment includes an electronic client device 602, which can include any appropriate device operable to send and/or receive requests, messages or information over an appropriate network 604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 602 and the application server 608, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 610 can include several separate data tables, databases, data documents, dynamic data storage schemes and/or other data storage mechanisms and media for storing data relating to a particular aspect of the present disclosure. For example, the data store illustrated may include mechanisms for storing production data 612 and user information 616, which can be used to serve content for the production side. The data store also is shown to include a mechanism for storing log data 614, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. The application server 608 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by an executing application on a client device, audiovisual data from a remote host;
   sampling, over a period of time, one or more application states of the executing application on the client device, the application states including information relating to a first set of audiovisual data used by the executing application during at least a portion of the period of time;
   analyzing, by the client device, the sampled application states to determine one or more characteristics associated with the audiovisual data;
   generating, by the client device, a second set of audiovisual data based at least in part on the determined characteristics, a subset of the first set of audiovisual data, and pre-existing audiovisual data on the client device partially matching the determined characteristics, the second set of audiovisual data matching the determined characteristics at a level higher than the pre-existing audiovisual data; and
   modifying, by the client device, the executing application to use the second set of audiovisual data at a time after the period of time.

2. The computer-implemented method of claim 1, wherein the first set of audiovisual data or the second set of audiovisual data include audio resources.

3. The computer-implemented method of claim 1, wherein determining the second set of audiovisual data includes retrieving, from an entity local to the client device, the second set of audiovisual data based at least in part on the determined characteristics.

4. The computer-implemented method of claim 1, wherein the determined one or more application states include information related to user interaction with the executing application.

5. A system, comprising:
   at least one computing device that at least:
   receives, from a device remote from the system, a first set of audiovisual data for use by an executing application;
   analyzes the executing application for a period of time for characteristics associated with the first set of audiovisual data;
   generates, based at least in part on the characteristics, a subset of the first set of audiovisual data, and pre-existing audiovisual data partially matching the characteristics, a second set of audiovisual data that matches the characteristics at a level higher than the pre-existing audiovisual data; and updates the executing application to use the second set of audiovisual data after the period of time.

6. The system of claim 5, wherein the at least one computing device further generates the second set of audiovisual data by at least analyzing the characteristics.

7. The system of claim 6, wherein the characteristics include one or more application states associated with the executing application.

8. The system of claim 6, wherein the at least one computing device further generates the second set of audiovisual data to replace a subset of the first set of audiovisual data used by the executing application prior to a time at which the computing device is configured to analyze the executing application.

9. The system of claim 6, wherein the at least one computing device further generates the second set of audiovisual data by applying at least frequency-based analysis to at least a subset of the characteristics.

10. The system of claim 5, wherein the at least one computing device further analyzes the executing application in response to unavailability of a remote resource used by the executing application.

11. The system of claim 5, wherein the executing application is interactive content or a video game application.

12. The system of claim 5, wherein at least some of the characteristics are associated with at least the subset of the first set of audiovisual data, the subset being of a different type than that of the second set of audiovisual data.

13. A non-transitory computer-readable storage medium having stored thereon executable instructions that, if executed by one or more processors of a computer system, cause the computer system to at least:

analyze an application executing on the computer system to determine characteristics of a first set of audiovisual data accessed, from a device remote from the computer system, by the executing application during a period of time;

process the determined characteristics, a subset of the first set of audiovisual data, and pre-existing audiovisual data on the computer system partially matching the determined characteristics to generate a second set of audiovisual data that matches the determined characteristics at a level higher than the pre-existing audiovisual data; and configure the executing application to use the generated second set of audiovisual data after the period of time.

14. The non-transitory computer-readable storage medium of claim 13, wherein the instructions further comprise instructions that, if executed by the one or more processors, cause the computer system to analyze the executing application by sampling information related to accesses by the executing application to the first set of audiovisual data.

15. The non-transitory computer-readable storage medium of claim 13, wherein the instructions further comprise instructions that, if executed by the one or more processors, cause the computer system to process the determined characteristics by applying at least frequency-based analysis to the determined characteristics.

16. The non-transitory computer-readable storage medium of claim 13, wherein the instructions further comprise instructions that, if executed by the one or more processors, cause the computer system to process the determined characteristics by at least determining a user context associated with the characteristics.

17. The non-transitory computer-readable storage medium of claim 16, wherein the instructions further comprise instructions that, if executed by the one or more processors, cause the computer system to generate the second set of audiovisual data such that the second set of audiovisual data is relevant to the user context.

18. The non-transitory computer-readable storage medium of claim 13, wherein the instructions further comprise instructions that, if executed by the one or more processors, cause the computer system to process the determined characteristics by at least interpolating one or more aspects of the determined characteristics.

19. The non-transitory computer-readable storage medium of claim 13, wherein the instructions further comprise instructions that, if executed by the one or more processors, cause the computer system to generate the second set of audiovisual data by retrieving the second set of audiovisual data from a second location that differs from a first location upon which the first set of audiovisual data is stored.

20. The non-transitory computer-readable storage medium of claim 13, wherein:
the first set of audiovisual data includes metadata,
a subset of the determined characteristics include the metadata of the first set of audiovisual data, and
the instructions further comprise instructions that, if executed by the one or more processors, cause the computer system to further generate the second set of audiovisual data based at least in part on the metadata.

* * * * *